US012559893B2

(12) United States Patent
Erdtmann et al.

(10) Patent No.: US 12,559,893 B2
(45) Date of Patent: Feb. 24, 2026

(54) ELECTRIFIED ROAD CONSTRUCTION MACHINE

(71) Applicant: JOSEPH VOEGELE AG, Ludwigshafen/Rhein (DE)

(72) Inventors: Bernhard Erdtmann, Edingen Neckarhausen (DE); Achim Eul, Mannheim (DE); Ralf Weiser, Ladenburg (DE); Johannes Pontius, Schmelz (DE)

(73) Assignee: JOSEPH VOEGELE AG, Ludwigshafen/Rhein (DE)

( * ) Notice: Subject to any disclaimer, the term of this patent is extended or adjusted under 35 U.S.C. 154(b) by 658 days.

(21) Appl. No.: 17/989,540

(22) Filed: Nov. 17, 2022

(65) Prior Publication Data

US 2023/0151561 A1 May 18, 2023

(30) Foreign Application Priority Data

Nov. 18, 2021 (EP) ..................................... 21209031
May 25, 2022 (EP) ..................................... 22175477

(51) Int. Cl.
E01C 19/48 (2006.01)
B60L 1/02 (2006.01)
(Continued)

(52) U.S. Cl.
CPC ............ E01C 19/4873 (2013.01); B60L 1/02 (2013.01); B60L 1/06 (2013.01); B60L 53/14 (2019.02);
(Continued)

(58) Field of Classification Search
CPC ............ E01C 19/4873; E01C 2301/04; E01C 2301/10; B60L 1/003; B60L 1/02;
(Continued)

(56) References Cited

U.S. PATENT DOCUMENTS 6,421,594 B1 * 7/2002 Erasmus ................. E01C 19/48
701/50
8,636,442 B1 1/2014 Sopko et al.
(Continued)

FOREIGN PATENT DOCUMENTS

CN 104937171 A 9/2015
CN 106677015 A 5/2017
(Continued)

OTHER PUBLICATIONS

International Search Report for Application No. 2022-182159, dated May 12, 2015, 5 Pages.
(Continued)

*Primary Examiner* — Raymond W Addie
(74) *Attorney, Agent, or Firm* — BROOKS KUSHMAN P.C.

(57) ABSTRACT

A road construction machine in the form of a road paver or a feeder vehicle for conveying paving material to a road paver, the road construction machine being self-propelled and having a primary drive source, a hopper, at least one working unit and at least one electric consumer for heating the working unit, the road construction machine having an energy supply system with at least one electrical energy storage which can be charged by means of electric current generated outside the road construction machine and is present on the road construction machine as an internal power source for direct current supply to the electric consumer. Furthermore, the disclosure relates to the use of such an energy storage for direct current supply to an electric consumer of a road construction machine.

20 Claims, 8 Drawing Sheets

(51) Int. Cl.

| | |
|---|---|
| *B60L 1/06* | (2006.01) |
| *B60L 53/14* | (2019.01) |
| *B60L 53/62* | (2019.01) |
| *B60L 1/00* | (2006.01) |

(52) U.S. Cl.
CPC .............. *B60L 53/62* (2019.02); *B60L 1/003* (2013.01); *B60L 2200/40* (2013.01); *E01C 2301/04* (2013.01); *E01C 2301/10* (2013.01)

(58) Field of Classification Search
CPC .. B60L 1/06; B60L 53/14; B60L 53/62; B60L 2200/40
USPC .................................. 404/75, 77, 79, 83, 118
See application file for complete search history.

(56) References Cited

U.S. PATENT DOCUMENTS

| | | | |
|---|---|---|---|
| 9,777,445 | B1 | 10/2017 | Engel et al. |
| 10,760,228 | B2 | 9/2020 | Heindtel et al. |
| 11,398,732 | B2 | 7/2022 | Hartl |
| 11,668,074 | B2 | 6/2023 | Ogawa et al. |
| 2010/0329783 | A1* | 12/2010 | Weiser .................... E01C 19/48 404/84.05 |
| 2011/0236131 | A1 | 9/2011 | Heindtel |
| 2014/0171260 | A1* | 6/2014 | Dalum .................. B60W 10/06 903/906 |
| 2015/0337504 | A1* | 11/2015 | Jorgensen ............... E01C 19/40 404/114 |
| 2017/0355373 | A1* | 12/2017 | Dalum ................ F16H 61/0031 |
| 2022/0074163 | A1 | 3/2022 | Terashima et al. |
| 2022/0290410 | A1 | 9/2022 | Ogawa et al. |
| 2023/0151561 | A1 | 5/2023 | Erdtmann et al. |

FOREIGN PATENT DOCUMENTS

| | | | | | |
|---|---|---|---|---|---|
| CN | 207469039 | U | 6/2018 | | |
| CN | 110172893 | A | 8/2019 | | |
| CN | 110915092 | A | 3/2020 | | |
| CN | 219342764 | U | 7/2023 | | |
| DE | 19912248 | A1 | 9/2000 | | |
| EP | 0628661 | A1 | 12/1994 | | |
| EP | 1118714 | A2 | 7/2001 | | |
| EP | 2110341 | A1 | 10/2009 | | |
| EP | 2333158 | A1 | 6/2011 | | |
| EP | 2372022 | A1 | 10/2011 | | |
| EP | 3890059 | A1 * | 10/2021 | .......... | H01M 50/574 |
| JP | 1998252012 | A | 9/1999 | | |
| JP | 2013113028 | A | 6/2013 | | |
| JP | 2015135026 | A | 7/2015 | | |
| JP | 2016118094 | A | 6/2016 | | |
| JP | 2018150714 | A | 9/2018 | | |
| JP | 2019157395 | A | 9/2019 | | |
| JP | 2020097867 | A | 6/2020 | | |
| JP | 2021050586 | A | 4/2021 | | |
| JP | 2022155176 | A | 10/2022 | | |
| WO | 2011135846 | A1 | 11/2011 | | |
| WO | 2012062384 | A2 | 5/2012 | | |
| WO | 2020200509 | A1 | 10/2020 | | |

OTHER PUBLICATIONS

European Search Report for Application No. 22175477.3, dated Nov. 21, 2022, 13 Pages.
CNIPA Search Report for CN Application No. 2022114495555, dated Apr. 27, 2025 (6 pages, including English translation).
CNIPA First Office Action in CN Application No. 2022114495555 dated Apr. 30, 2025 (13 pages, including English translation).
European Search Report for Application No. 21209031.0, dated May 9, 2022, 7 Pages.

* cited by examiner

ELECTRIFIED ROAD CONSTRUCTION MACHINE

CROSS-REFERENCE TO RELATED APPLICATIONS

This application claims foreign priority benefits under 35 U.S.C. § 119(a)-(d) to European patent application number EP 21209031.0, filed Nov. 18, 2021, and European patent application number EP 22175477.3, filed May 25, 2022, both of which are hereby incorporated herein by reference in their entireties.

TECHNICAL FIELD

The present disclosure relates to a road construction machine in the form of a road paver or a feeder vehicle for a road paver and a method for supplying an electric consumer thereof.

BACKGROUND

Road pavers are used to place a surface of paving mix or paving material or asphalt mix, e.g. concrete, bituminous paving mix or asphalt, on a square, path or road. Such a road paver usually has a hopper for storing a certain amount of paving mix. Road pavers of this type have a large number of electric consumers, including in particular the heating devices for the screed plates, tamper and the like in the paving screed, which consume a considerable amount of electricity. When the storage capacity for paving material needs to be increased, a feeder vehicle is placed in front of the road paver in the working direction. The feeder vehicle comprises a further hopper and a conveying device for transporting paving mix from the feeder hopper into the hopper of the road paver. In addition to the conveying device, further working units can be provided, for example, scrapers, vibrators or a heating device, in order to improve the conveying process and to prevent the usually hot paving mix from cooling and solidifying too quickly.

The electric consumers of the road construction machine are usually supplied with energy by a generator, which in turn is driven by a primary drive source in the form of an internal combustion engine, usually a diesel engine. The diesel engine is supplied with fuel from a fuel tank. In some road construction machines, the generator is connected to a drive output of a pump transfer gearbox and is driven by the pump transfer gearbox. The disadvantage of this is that losses occur during power generation through the pump transfer gearbox. This increases fuel consumption and environmental pollution from exhaust gases.

A road paver is known from EP 1 118 714 B1 and a feeder is known from EP 2 110 341 A1.

EP 0 628 661 B1 discloses a road paver with an internal combustion engine driving a three-phase generator connected thereto for power generation.

WO 2011/135846 A1 discloses a heating device of a road paver energizable by means of an internal and an external power source.

SUMMARY

It is the object of the disclosure is to provide an energy-efficient and environmentally friendly road construction machine in the form of a road paver or a feeder vehicle for a road paver.

This object is solved by the features shown and described in detail herein.

The disclosure relates to a road construction machine in the form of a road paver or a feeder vehicle for conveying paving mix to a road paver. The road construction machine is self-propelled and has a primary drive source, a hopper, at least one working unit, and at least one electric consumer for heating the working unit. According to the disclosure, the road construction machine has an energy supply system with at least one electrical energy storage which can be charged by means of electric current generated outside the road construction machine and which is configured on the road construction machine as an internal power source for direct power supply to the electric consumer.

The current used to charge the electrical energy storage can be generated or made available in the form of electrical energy by means of an external power source, for example by means of an external power generator, an external energy storage and/or a charging station. In this context, "external" means that the power source is located outside the road construction machine and that no units of the road construction machine are required for external power generation, i.e. the external power generation is above all not dependent on the operation of the primary drive source of the road construction machine. This means that the generator, which is usually driven by the primary drive source of the road construction machine, can be isolated from the energy supply system for the electric consumer as an internal or external electric power source of the road construction machine, or, if necessary, completely removed from the road construction machine.

In the disclosure, therefore, low-loss operation of the electric consumer is achieved by means of the electrical energy storage. An advantage of the disclosure is also that a pump transfer gearbox and/or the primary drive source no longer need to be driven for power generation or power supply to the electric consumer. Rather in the disclosure, the electric consumer can be operated directly, especially when the vehicle engine is switched off, with externally generated electrical energy that is stored in the electrical energy storage of the road construction machine that is connected to the electric consumer and can be charged by means of the external power source. In other words, the electrical energy storage can enable self-sufficient operation of the electric consumer connected to it on the road construction machine. The externally generated power can be stored as electrical energy in the energy storage, for example in a battery located in the road construction machine, in the form of chemical energy and converted into electrical energy when required and used for the direct power supply of the electric consumer. This results in a direct power supply from the electrical energy storage to the electric consumer connected to it, if necessary still (frequency) redirected, via a power supply path without power-generating (generator), power-burning (combustion engine), power-distributing (pump transfer gearbox) and/or power-consuming (e-motor) units integrated in it. This results in direct energy storage operation for the electric consumer. This reduces the energy losses required to keep the electric consumer, such as a screed heater, ready for work.

The electric consumer can be connected directly to the energy storage, i.e. the current from the energy storage arrives directly at the consumer. The electric consumer is used in particular as a direct battery-operated consumer. The energy supply system can be configured to supply the electrical energy storage by means of electric current generated outside the road construction machine, i.e. to charge it electrically, whereby the electric consumer is connected directly as a consumer to the electrical energy storage in order to be supplied with electric current directly from the electrical energy storage.

According to an embodiment, the electric consumer can be energized by means of the electrical energy storage independently of the operation of the primary drive source. This means that the electric consumer can basically be supplied with current from the energy storage at any time, i.e. even when the engine is switched off. This means, for example, that breaks in the operation of the road construction machine and/or transport travels can be used to maintain the unit, which can be heated by the consumer, at a desired temperature level.

One variant provides that the electrical energy storage is a battery. This is compact and easy to maintain. The energy storage can also be assembled from several batteries. The battery can be charged by an external power source, for example when the road construction machine is out of operation. It is conceivable that a separate construction site vehicle driving alongside the road construction machine could be used to charge the battery. This would allow the battery to be charged even during a paving operation. According to one variant, the external power source is an exchange station that can be used to replace an empty battery with a fully charged one.

It would make sense for the battery to be located in the area of the electric consumer within a heat-insulating housing. The proximity of the battery to the consumer can result in design advantages, especially in terms of installation space.

Preferably, all electric consumers of the road construction machine, also including electric consumers which are not used for heating the unit, are operated exclusively by means of electric current generated outside the road construction machine and stored by the electrical energy battery of the road construction machine. According to this embodiment, the road construction machine is no longer a power generator for its electric consumers. This means that the road construction machine itself no longer needs to be fitted with a generator to generate electricity for the consumers.

It would be conceivable for the energy storage to be arranged centrally on the road construction machine, for example in the engine compartment of the road construction machine, in order to supply power from there to various electric consumers of the road construction machine. Alternatively, the energy storage can also be in the form of an energy storage network, for example having a number of energy storage modules connected to form a power supply network and distributed on the road construction machine, for example a number of interconnected batteries.

It is conceivable that the energy storage is associated with the electric consumer, for example placed on a paving screed of the road paver. The electrical energy storage may be replaceable and/or rechargeable. The electrical energy storage may be a battery, for example a lithium-ion battery or nickel-metal hydride battery. The electrical energy storage may include one or more capacitors.

The heatable working unit may be a paving screed, particularly components used thereon for pre-compaction, movable or rigidly mounted to the screed body. The working unit can be a conveyor, a transverse distributor, a bearing device, for example a transverse distributor suspension, an adjusting device, for example a leveling device, a reservoir or a hopper, in particular in order to avoid adhesion of a paving mix and/or to improve its controllability. It would be conceivable that the heatable unit is a drive unit used on the road construction machine, for example an electric motor. According to an embodiment, the unit is a transfer gearbox, for example a pump transfer gearbox, and/or at least one hydraulic component driven by it, for example a hydraulic pump.

The electric consumer can be configured as a heating rod arranged on one of the components of the road construction machine, in particular in the area of a component of the paving screed that processes the paving material. However, a rod shape is not necessary. It would be conceivable for the electric consumer to be in the form of a heating mat, a sheathing or as an integral component of the heatable unit. It is conceivable that the heatable unit is formed, at least in certain areas, from an electrically conductive material whose specific electrical resistance is utilized for heating the unit.

In particular, two separate power supply paths can lead away from the electrical energy storage. In a first power supply path, the electrical energy storage can supply an electric motor of the road construction machine, which may be connected to a chassis and/or hydraulic units, optionally to these via a pump transfer gearbox. In a second power supply path, the electrical energy storage device can directly supply power to the electric consumer of the road construction machine. Both power supply paths can thus be supplied with power from the energy storage independently of each other.

The energy supply system allows the electrical energy storage to be supplied primarily by means of electrical power generated outside the road construction machine. In addition, the electric consumer can be operated autonomously via the second power supply path, in particular without power losses resulting from the first power supply path.

It is conceivable that the electrical energy storage can be charged with electricity by a (hybrid) drive train integrated on the road construction machine, which in particular has an internal combustion engine and/or electric motor, a hydrogen engine and a generator connected to it, possibly via a pump transfer gearbox. This variant could be used in an emergency to charge the energy storage if a charging state thereon reaches or falls below a predetermined threshold value and charging by externally generated electricity is not possible due to the situation.

In an embodiment of the disclosure, the energy supply system is connectable to an external power source for charging the electrical energy storage. The external power source is external to the road construction machine. For example, the external power source may be an external power generator, an external energy storage, or a charging station of a utility company. The external power source may be a power grid.

A current collector may be used to transfer electrical energy from the power grid to the energy supply system. The current collector can be a mobile (vehicle) unit that is intended for the intermediate storage of electrical energy for construction site use, serving as a current supply vehicle for the road construction machine, so to speak.

The external power source can be a power supply by means of a transport vehicle for transporting the road construction machine, for example a low-loader. This variant has the advantage that the heatable working unit of the road construction machine can already be heated up and brought to operating temperature during the transport of the road construction machine to the construction site, so that the working unit and the construction machine are ready for operation immediately upon arrival at the construction site and can start their work as early as possible. The external power source could also be another road construction machine used together with the road construction machine on the construction site.

In an embodiment of the disclosure, the energy supply system is configured to supply electric current to the electric consumer by means of the external power source and/or by means of the internal power source (energy storage). Depending on availability, the electric current of the respective power sources may be coordinated with each other on a percentage basis. During road paving, it is particularly advantageous if the electric consumer can be supplied with electricity directly by means of the energy storage present as an internal power source, i.e. not by means of a generator driven by the pump transfer gearbox, if applicable. The external power source can be one of the examples mentioned above.

Supplying the electric consumer by means of the external power source may be advantageous during a charging process of the energy storage used as internal power source. This can shorten the charging process. In this context, it would be conceivable that during a charging process of the energy storage, the electric consumer is automatically supplied with current via the external power source used for charging the energy storage and/or by means of another internal power source used on the road construction machine, for example a generator or a backup battery. This results in uninterrupted operational readiness of the electric consumer.

The energy supply system may have at least one electrical line, whereby the electric consumer is connectable to the internal power source. The energy supply system can have at least one electrical line, whereby the electrical energy storage can be connected to the external power source. For an operation of the electric consumer by means of the external power source, it would be conceivable that the two lines are bridgeable with each other.

According to an embodiment of the disclosure, the line used to connect the energy storage to the electric consumer is configured both for transporting current and for transporting data, and is present as a power line, so to speak. This would make it possible to forward data indicating a functionality of the consumer, for example a temperature curve measured thereon, and/or energy-storage-related data, for example its charging state, to a controller, in particular to a charge management system, of the road construction machine for evaluation. It would be conceivable for such data to also be sent to an external device, for example to a data management device of the construction site operator, in order to create a construction site log.

In an embodiment of the disclosure, the power system includes at least one frequency converter, a DC-DC converter, and/or a DC-AC converter. The frequency converter may be a power converter that converts one frequency and amplitude of an AC input voltage to another frequency and amplitude of an output voltage. The DC-DC converter, also called a DC-DC converter, may be a power converter that converts a DC voltage supplied at the input to a DC voltage with a higher, lower, or inverted voltage level. The DC-AC converter may be a power converter or inverter that converts the DC voltage to AC voltage. The frequency converter, the DC-DC converter, and/or the DC-AC converter may be configured to step down the input voltage, for example, from 380V or 400V or 800V to a voltage suitable for operation of the electrical load, for example, 12V or 24V or 48V.

The frequency converter, the DC-DC converter and/or the DC-AC converter can be integrated in the power supply path between the energy storage and the electric consumer. It is conceivable that the frequency converter, the DC-DC converter and/or the DC-AC converter can also be used to supply current to the electric consumer by means of the external power source, so to speak for both internal and external energy supply to the electric consumer.

In an embodiment of the disclosure, the electric consumer is a DC consumer powered by direct current. Alternatively, the electric consumer is an AC consumer powered by alternating current. In one variant, the electric consumer is both, i.e. configured for a DC operation and for an AC operation. Conceivably, the consumer would be a DC consumer for the internal power source and an AC consumer for the external power source.

In an embodiment of the disclosure, the electric consumer is a DC consumer and the electric consumer is connected to the electrical energy storage via the DC-DC converter.

In an embodiment of the disclosure, the electric consumer is an AC consumer and the electric consumer is connected to the electrical energy storage via the frequency converter.

In an embodiment of the disclosure, the electric consumer is an AC consumer and the electric consumer is connected to the electrical energy storage via the DC-AC converter.

In an embodiment of the disclosure, the energy supply system includes an AC-DC charge management system and/or an AC charge management system. The electric consumer or electrical energy storage may be directly connected to the AC-DC and/or to the AC charge management system. The charge management system may be used to control a charging process of the electrical energy storage and/or a direct current supply to the electric consumer. The charge management system may ensure that a power limit of the electric consumer and/or electrical energy storage is not exceeded.

In an embodiment of the disclosure, the road construction machine has a pump transfer gearbox and hydraulic pumps connected thereto, wherein electrical energy storage in the energy supply system is configured to provide power to the electric consumer independently of the operation of the pump transfer gearbox. The electric consumer and the pump transfer gearbox can thus be operated on the road construction machine in isolation from one another, i.e. they are connected in separate energy supply paths. The electric consumer and the pump distributor gearbox can therefore be supplied with power separately from each other.

In particular, there is direct battery operation of the electric consumer. The electric consumer can be a DC consumer. The type of current and the current intensity from the energy storage can be converted, i.e. precisely configured to the operating conditions of the electric consumer.

In an embodiment of the disclosure, the energy supply system comprises a controller configured to monitor a charging state of the electrical energy storage, for example via the line configured as a power line, and/or to control a charging process of the electrical energy storage via a switch and/or to control the supply of electric current to the electric consumer as a function of a charging state of the electrical energy storage.

The controller may be configured to switch the supply of electric current to the electric consumer from an internal supply by the electrical energy storage to an external supply by the external power source when the charging state of the electrical energy storage falls below a predetermined threshold. This can assure that a paving mix maintains a desired paving temperature.

In particular, the controller can be configured to start the charging process of the electrical energy storage only when the charging state of the electrical energy storage falls below a predetermined value. In this way, the power density of the electrical energy storage can be better maintained at a constant, high level.

In an embodiment of the disclosure, the energy supply system includes at least one temperature sensor connected to the controller and configured to sense a temperature of the paving material, the electric consumer, and/or the working unit. The temperature sensor may be arranged on the working unit or formed thereon as an integral component. The temperature sensor can be integrated in the electric consumer.

In an embodiment of the disclosure, the controller may be configured to activate and deactivate the supply of electric current to the electric consumer via a switch. Conceivably, in order to conserve electricity, the electric consumer could be de-energized at pre-determined switching intervals. For example, current interruptions could tend to increase during the paving run. The idea behind this is that the road construction machine as a whole heats up during the paving operation due to waste heat from individual units installed therein, i.e. the unit that can be heated according to the disclosure also benefits from this heat balance.

In an embodiment of the disclosure, the road construction machine is a road paver, wherein the electric consumer is a heating device and the working unit is a paving screed of the road paver, wherein the heating device is configured to heat at least one component of the paving screed. The controller may be configured to provide dynamic temperature control and/or power limitation of the heating device.

Preferably, the energy storage on the road paver is in the form of a battery. This results in a battery-powered heating device for the paving screed of the road paver. The battery can be the only internal power source on the road paver for the heating device.

By means of the component, the hot paving mix (asphalt) can be spread, compacted and/or smoothed in particular. By heating the component, the processing temperature of the paving mix can be maintained until the paving mix is placed as a pavement. The component can be a screed plate or a tamper or a pressure bar of the paving screed. The heatable working unit of the road paver may also be an auger bearing block mounted on the transverse spreading device of the road paver or another component of the transverse spreading device, a conveyor and/or a hopper.

In an embodiment of the disclosure, the road construction machine is a feeder vehicle for conveying paving material to a road paver, wherein the electric consumer is a heating device and the working unit is a transport device of the feeder vehicle, wherein the heating device is configured for heating at least one component of the transport device of the feeder vehicle. It can thus be avoided that the paving mix cools down and/or sticks to the conveyor belt. A hopper of the feeder vehicle can also be considered as a heatable working unit of the feeder vehicle.

Preferably, the energy storage on the feeder vehicle is in the form of a battery. This results in a battery-powered heating device for the transport device of the feeder vehicle. The battery may be the only internal power source on the feeder vehicle for the heating device.

In an embodiment of the disclosure, the road construction machine comprises an electric motor, a hydrogen engine, a fuel cell, an internal combustion engine, and/or a hybrid engine as the primary power source. Conceivably, the e-motor could be powered by the electrical energy storage. Alternatively, the e-motor could be supplied with current from a separate electrical energy storage used on the road construction machine.

The electrical energy storage can supply electric current to the electric consumer and the e-motor (electric motor) in separate, parallel energy supply paths. In a system in which the primary drive source is configured as an electric motor, the generator conventionally driven by the primary drive source of the road construction machine, in particular via a pump transfer gearbox, can be isolated as an internal power source from the energy supply system for the electric consumer or, if necessary, completely removed from the road construction machine. Thus, low-loss direct operation of the electric consumer(s) by means of the energy storage is possible. The main advantage of such separate energy supply paths is that the electric consumer can be driven independently of a pump transfer gearbox, which may be connected to an electric motor, an internal combustion engine and/or a hydrogen engine. This can increase the operating time of the road construction machine and provides reduced energy or fuel consumption. In a hybrid drive system, it is possible to drive the pump transfer gearbox, for example, by means of an internal combustion engine and, in an energy supply path separate from the pump transfer gearbox, to supply the electric consumer with electricity from the electrical energy storage directly, i.e., in isolation from the pump transfer gearbox. In this system, it would still be possible to provide a generator in parallel, which is driven by the combustion engine, for example.

The disclosure relates to the use of an electrical energy storage arranged on a road construction machine as an internal power source, which can be charged by means of an external power source, for directly supplying current to an electric consumer provided on the road construction machine, which is used for heating a working unit of the road construction machine.

In particular, a method for supplying current to the electric consumer of the road construction machine is provided, wherein the electric consumer is supplied from an external power source and/or is supplied from the energy storage installed on the road construction machine as an internal power source, wherein the energy storage can be charged by the external power source.

In addition to the road construction machine's electrical energy storage, another internal power source, such as a generator, is used as an internal power source. This can supply one or more electric motors of the road construction machine with electric current.

It would be possible for both the electric consumer and the electric motor or motors to be connected to the energy storage via separate energy supply paths.

Most importantly, the energy storage may be in the form of a battery so that the electric consumer may be directly battery powered.

In an embodiment of the disclosure, the following steps are performed: Monitoring a temperature of the energy storage, the consumer, and/or the working unit by means of a temperature sensor, activating the electric power supply of the electric consumer for heating the working unit in dependence of the detected temperature via a switch, so that the electric consumer energy storage is supplied. The aforementioned working steps can be controlled by means of a control system of the road construction machine.

The controller can also monitor a charging state of the electrical energy storage, and disconnect the electrical supply to the electric consumer from the electrical energy storage when the charging state of the electrical energy storage falls below a set point. In this case, the controller may switch on the electrical supply to the electric consumer in dependence on the detected temperature via a second switch, so that the electric consumer is supplied with electric current from the external power source. All features disclosed in connection with the road construction machine in the form of a road paver or a feeder vehicle for conveying paving material to a road paver may be used individually or together in the method for supplying electric current to an electric consumer of a road construction machine. All features disclosed in connection with the method for supplying an electric consumer of a road construction machine can be used individually or together in the road construction machine in the form of a road paver or a feeder vehicle for conveying paving material to a road paver.

BRIEF DESCRIPTION OF THE DRAWINGS

In the following, exemplary embodiments are explained on the basis of the Figures.

DETAILED DESCRIPTION

Figure 1:
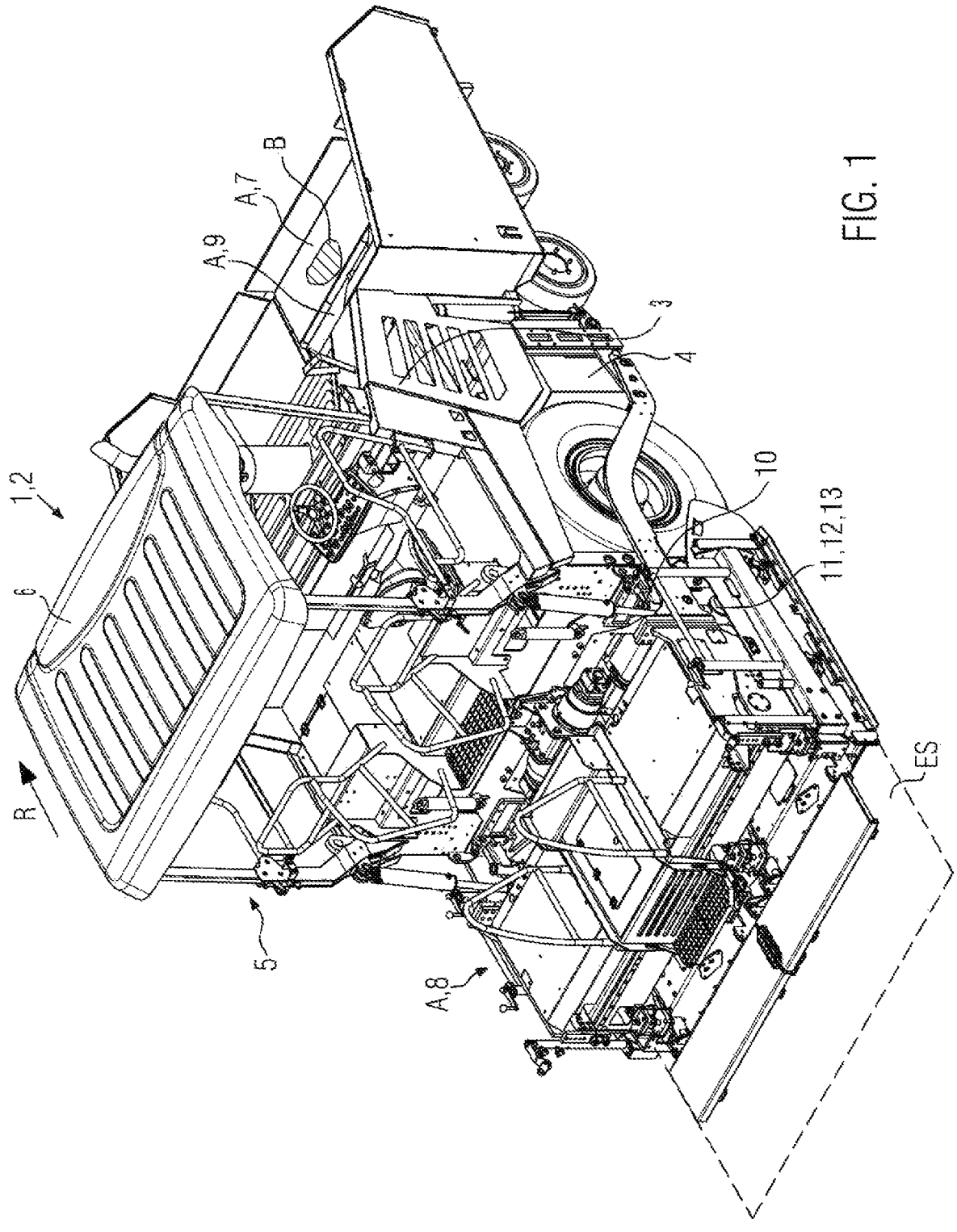
FIG. 1 shows a schematic perspective representation of a road construction machine in the form of a road paver.

FIG. 1 shows a perspective view from the rear of a road construction machine 1, which is a road paver 2 for producing a paving layer ES. The road paver 2 is self-propelled. The road paver 2 has a primary drive source 3, a chassis 4, an operator's platform 5, an operator's roof 6, working units A, such as a hopper 7 for receiving a paving material B (asphalt mix), a paving screed 8 mounted on the chassis 4 so as to be adjustable in height and towed in the direction of travel R, a conveyor unit 9 comprising a conveyor belt 9a to provide the paving material B from a hopper 7 of the road paver 2 to the paving screed 8 to a transverse spreading device 10 of the road construction machine 1. The primary drive source 3 may be an electric motor 3a (FIG. 3a), a hydrogen engine (not shown), an internal combustion engine 3b, and/or a hybrid engine 3c.

The road paver 2 has at least one electric consumer 11 for heating a working unit A.

In this case, the paving screed 8 is a heatable working unit A of the road paver 2. The paving screed 8 includes components 12 such as compaction units (screed plates, tamper and pressure bars (not shown)). The paving material B is compacted by the action of the dead weight of the compacting unit. To prevent a paving material B from sticking to the components 12 of the paving screed 8, heating devices 13 are integrated on these components 12. The heating devices 13 are electric consumers 11 of the road paver 2.

Figure 2:
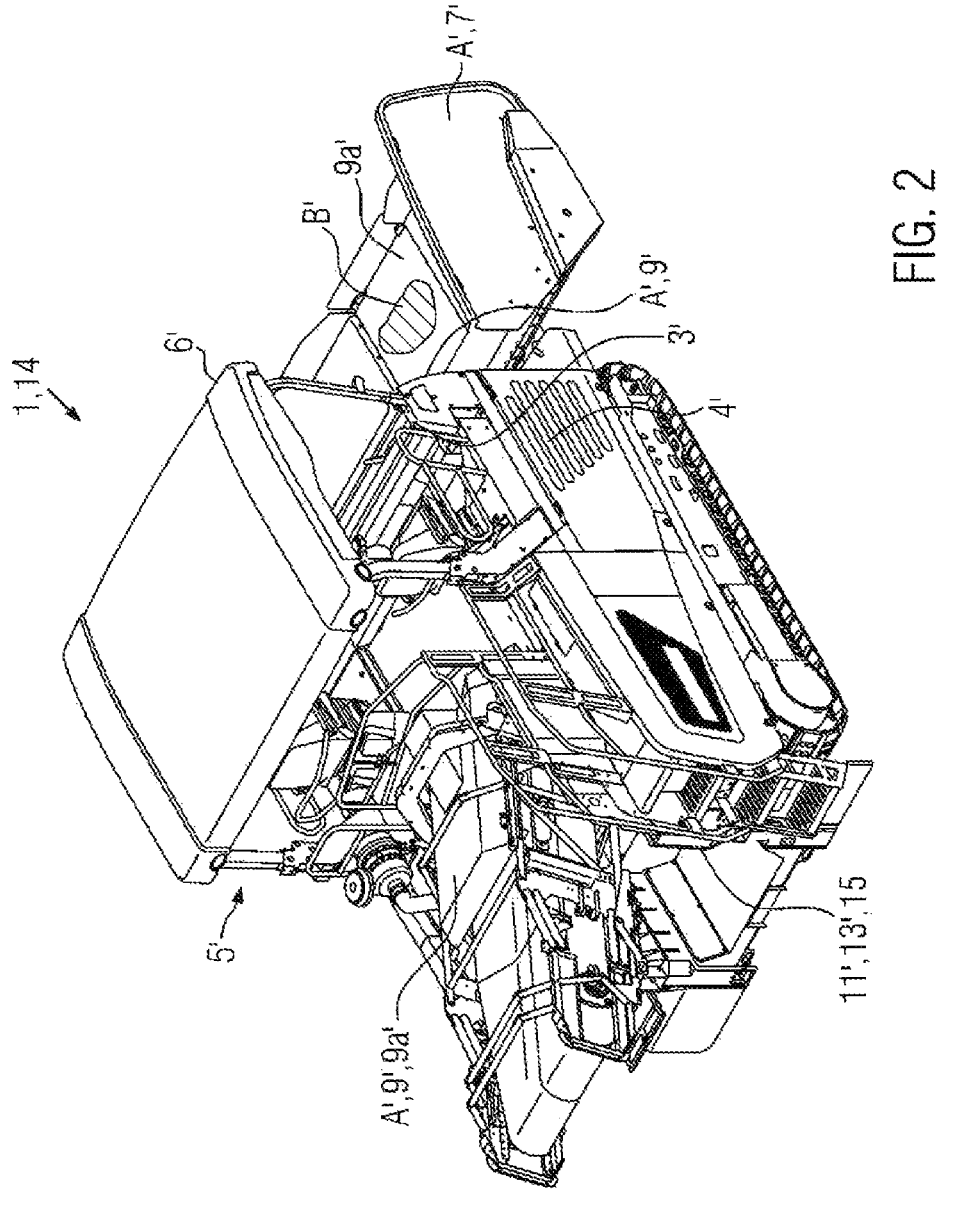
FIG. 2 shows a schematic perspective representation of a road construction machine in the form of a feeder vehicle for conveying paving material to a road paver.

FIG. 2 shows a perspective view from diagonally behind of a road construction machine 1, which is a feeder vehicle 14 for conveying paving material B' to a road paver 2 travelling behind. The feeder vehicle 14 is self-propelled and comprises a primary drive source 3' a chassis 4', an operator's platform 5', an operator's roof 6', working units A', such as a hopper 7' for receiving the paving material B', and a conveyor unit 9', comprising a conveyor belt 9a', for transporting the paving material B', from the hopper 7' of the feeder vehicle 14 to the hopper 7' of the road paver 2. The primary drive source 3' can be an electric motor 3a', a hydrogen engine (not shown), an internal combustion engine 3b', and/or a hybrid engine 3c.

The feeder vehicle 14 has at least one electric consumer 11' as a heating device 13' for heating a working unit A'.

In this case, the conveyor belt 9a' is a heatable working unit A' of the feeder vehicle 14. At least one component 12' such as a conveyor belt heater 15 is integrated on the conveyor belt 9a' as a heating device 13'. The conveyor belt heater 15 is an electric consumer 11' of the feeder vehicle 14.

Figures 3A, 3B, 3C:
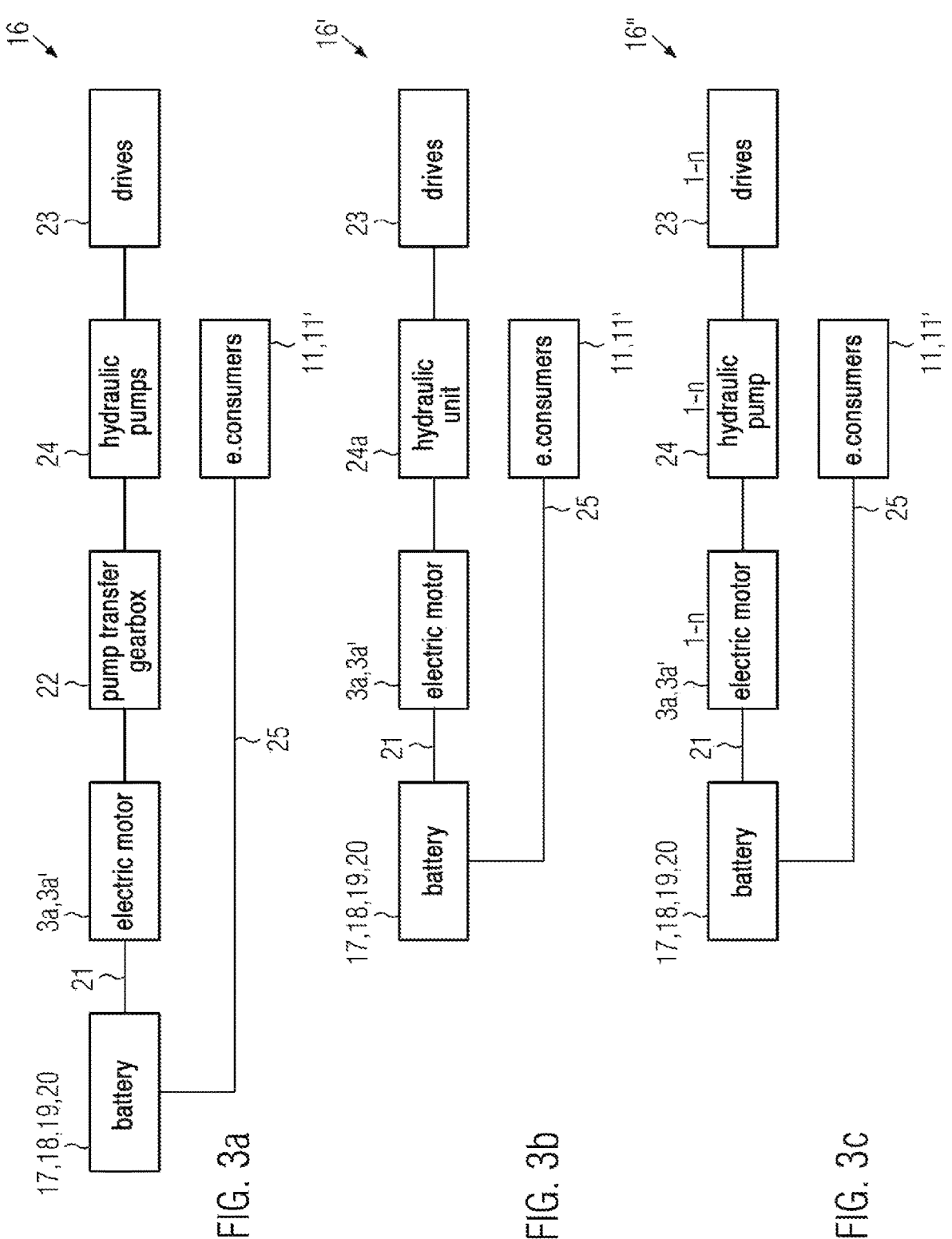
FIGS. 3a-3c show schematic representations of embodiments of the road construction machine energy supply system according to the disclosure.

FIG. 3a shows a schematic representation of an embodiment of the energy supply system 16 of the road construction machine 1, 2, 14. The energy supply system 16 comprises at least one electrical energy storage 17 as an internal power source 18 of the road construction machine 1. The electrical energy storage 17 is a battery 19. The battery 19 is the primary energy source 20 of the road construction machine 1, 2, 14.

The battery 19 supplies power to the electric motor 3a, 3a' via a first current supply path 21. The electric motor 3a, 3a' drives a pump transfer gearbox 22. The pump transfer gearbox 22 in turn drives further drives 23 of the road construction machine 1 via hydraulic pumps 24.

The battery 19 supplies the electric consumers 11, 11' of the road construction machine 1 in a second current supply path 25, which is separate from the first current supply path 21 (i.e. without detour via the pump transfer gearbox). By means of the second current supply path 25, a direct current supply to the electric consumers 11, 11' can take place.

In the case that the road construction machine 1 is a road paver 2, the electric consumer 11 is the heating device 13 installed in the paving screed 8. In the case that the road construction machine 1 is a feeder vehicle 14, the electric consumer 11' is the conveyor belt heater 15. By means of the energy supply system 16 of FIG. 3a, the electric motor 3a, 3a' can be out of operation when heating power for the working units A, A' is required. The working units A, A' can therefore still be kept warm by means of battery operation.

FIG. 3b shows a schematic representation of an embodiment of the energy supply system 16' of the road construction machine 1, 2, 14. The energy supply system 16' differs from the energy supply system 16 shown in FIG. 3a in that the hydraulic power unit 24a is driven directly by the electric motor 3a, 3a'.

FIG. 3c shows a schematic representation of an embodiment of the energy supply system 16" of the road construction machine 1, 2, 14. The energy supply system 16" differs from the energy supply system 16 shown in FIG. 3a in that, if necessary, several hydraulic units 24 are driven by the electric motor 3a, 3a' in parallel drive trains.

Figure 4:
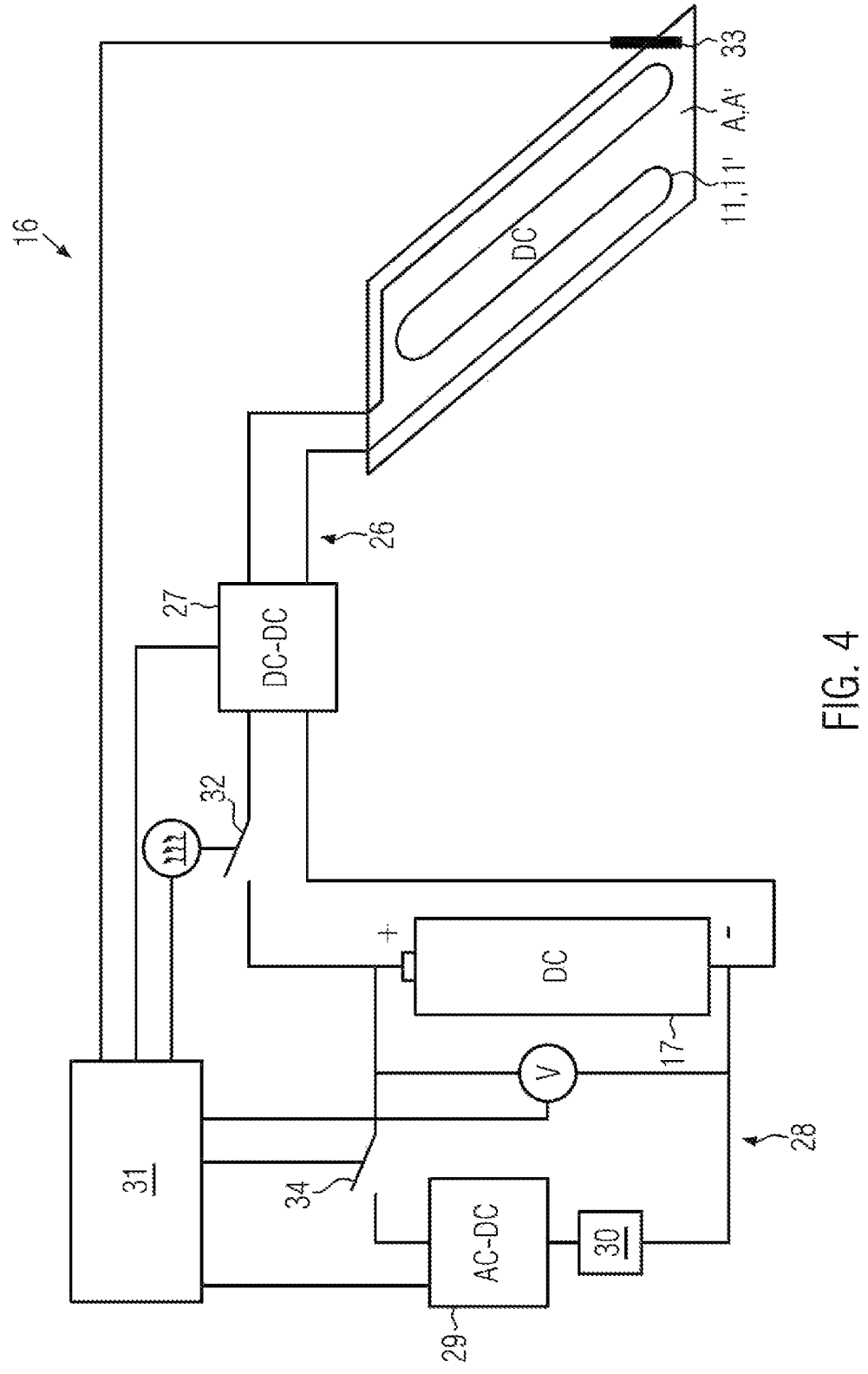
FIG. 4 shows a schematic representation of one embodiment of the energy supply system.

The respective energy supply systems 16, 16', 16" have in common that the electric consumers 11, 11' are directly battery-powered via the second current supply path 25. FIG. 4 shows a schematic representation of a first embodiment of the energy supply system 16 of the road construction machine 1, 2, 14. In the first embodiment, the electric consumer 11, 11' is a DC consumer (direct current consumer) for heating a working unit A, A' of the road construction machine 1. In a first circuit 26, the electric consumer 11, 11' is connected to the electrical energy storage 17 of the energy supply system 16 via a DC-DC converter 27. The DC-DC converter 27 ensures that an input electric current is configured to a current necessary for the operation of the electric consumer 11, 11'. In a second circuit 28, the electrical energy storage 17 is connected to an external power source 30 (for example, power grid, or charging post or power supply unit of a charging vehicle or charging station) via an AC-DC charge management system 29 of the energy supply system 16. The AC-DC charge management system 29 ensures that an input electric current from the external power source 30 is matched to a current required to operate the electrical energy storage 17.

A controller 31 of the energy supply system 16 can control, or activate or deactivate, the supply of current from the electrical energy storage 17 to the electric consumer 11, 11' as desired via a first switch 32. A temperature sensor 33 is arranged on the working unit A, A'. The controller 31 can monitor a temperature of the working unit A, A' and, depending on the measured temperature value, control the supply of the electric current to the electric energy storage 11, 11'. The controller 31 can monitor a charging state of the electrical energy storage 17 and accordingly control, or activate or deactivate, the charging process via a second switch 34. The electric consumer 11, 11, is powered by the electrical energy storage 17 when the first switch 32 is closed. If the charging state falls below a threshold value, the electric consumer 11, 11' can be supplied directly from the external power source 30 by closing the first switch 32 and the second switch 34.

As those skilled in the art will understand, the controller 31, as well as any other unit, component, module, system, subsystem, interface, sensor, device, or the like described herein may individually, collectively, or in any combination comprise appropriate circuitry, such as one or more appropriately programmed processors (e.g., one or more microprocessors including central processing units (CPU)) and associated memory, which may include stored operating system software, firmware, and/or application software executable by the processor(s) for controlling operation thereof and for performing the particular algorithm or algorithms represented by the various methods, steps, functions and/or operations described herein, including interaction between and/or cooperation with each other. One or more of such processors, as well as other circuitry and/or hardware, may be included in a single Application-Specific Integrated Circuit (ASIC), or several processors and various circuitry and/or hardware may be distributed among several separate components, whether individually packaged or assembled into a System-on-a-Chip (SoC).

Figure 5:
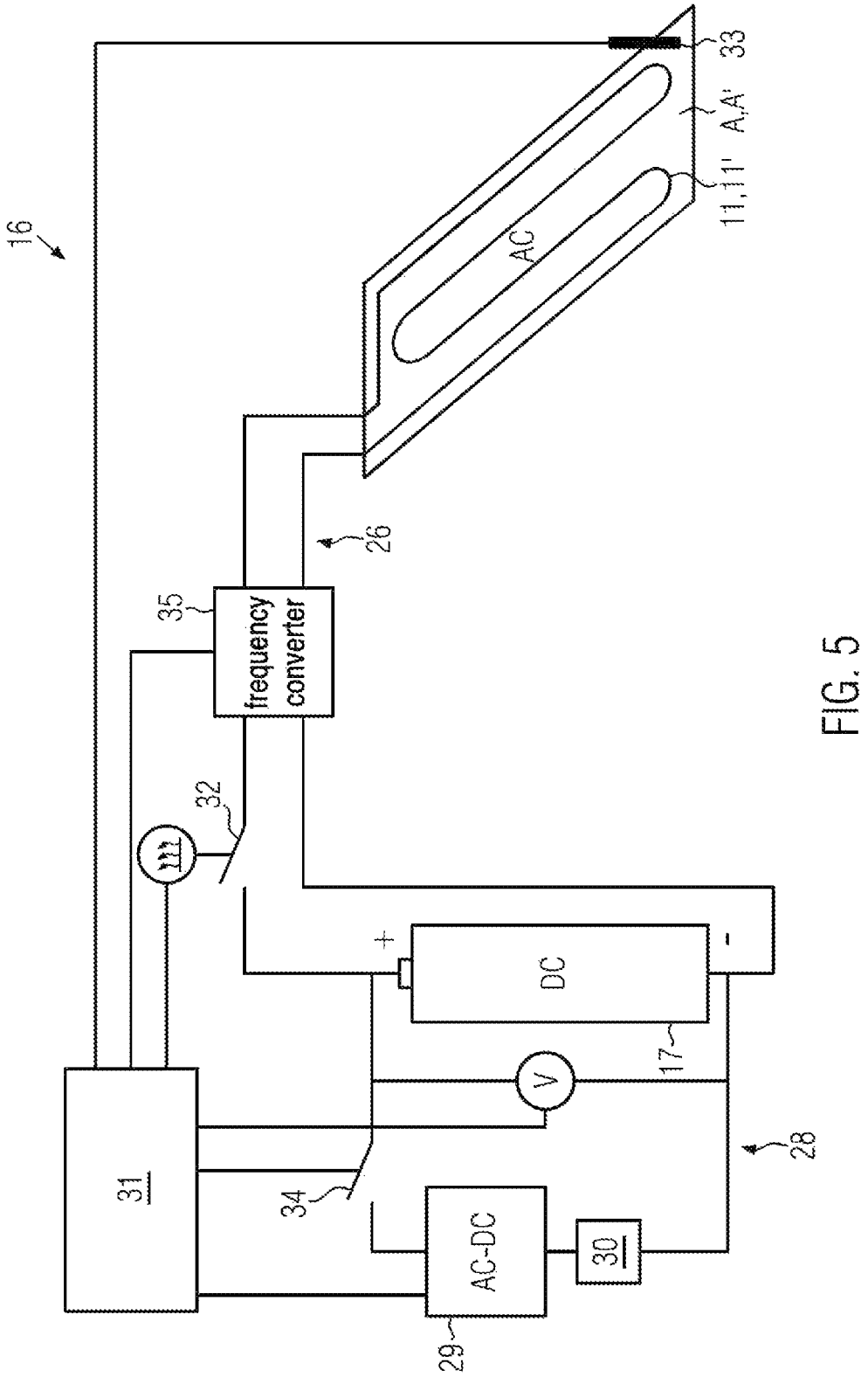
FIG. 5 shows a schematic representation of a further embodiment of the energy supply system.

FIG. 5 shows a schematic representation of a second embodiment of the energy supply system 16 of the road construction machine 1, 2, 14. The second embodiment differs from the first embodiment in that the electric consumer 11, 11' is an AC consumer (alternating current consumer) and is connected to the electrical energy storage 17 via a frequency converter 35. The frequency converter 35 ensures that an input-side electric current is configured to a current necessary for operation of the electric consumer 11, 11'.

Figure 6:
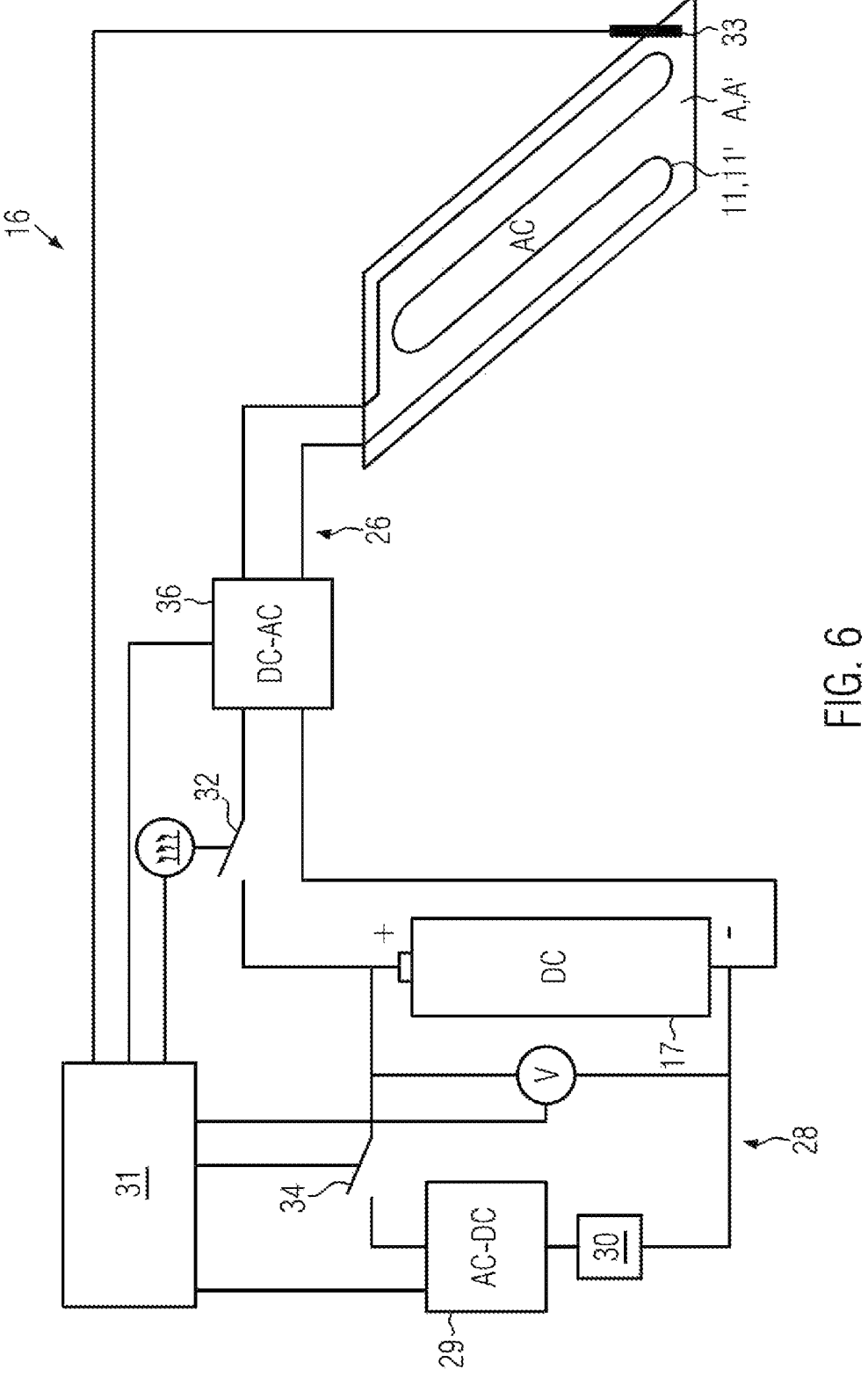
FIG. 6 shows a schematic representation of a further embodiment of the energy supply system.

FIG. 6 shows a schematic representation of a third embodiment of the energy supply system 16 of the road construction machine 1, 2, 14. The third embodiment differs from the second embodiment in that the electric consumer 11, 11' is connected to the electrical energy storage 17 of the energy supply system 16 via a DC-AC converter 36. The DC-AC converter 36 ensures that an input electric current is configured to a current necessary for the operation of the electric consumer 11, 11'.

Figure 7:
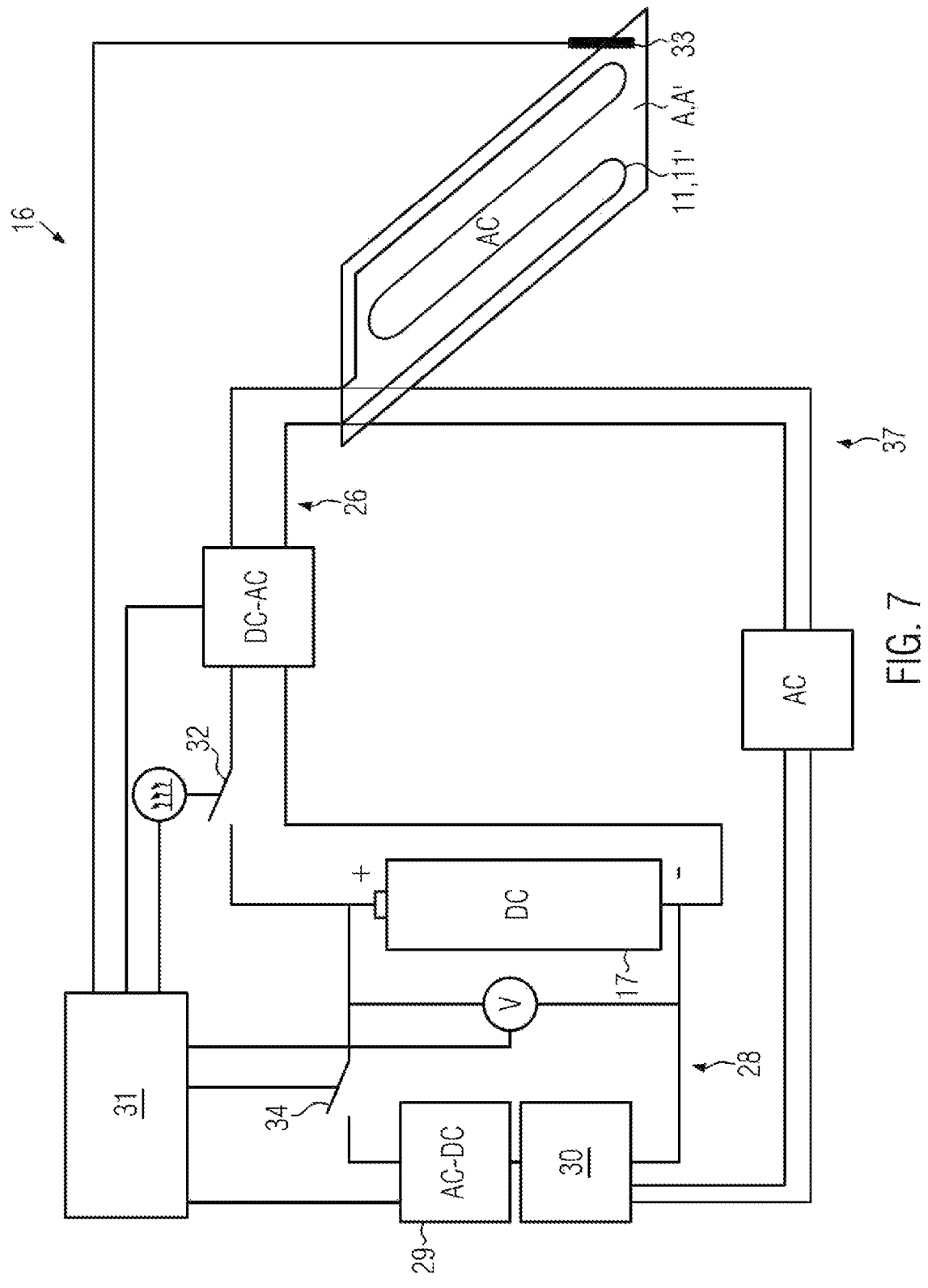
FIG. 7 shows a schematic representation of a further embodiment of the energy supply system.

FIG. 7 shows a schematic representation of a fourth embodiment of the energy supply system 16 of the road construction machine 1, 2, 14. The fourth embodiment differs from the second and third embodiments in that the electric consumer 11, 11' is connected to the external power source 30 in a third circuit 37 via an AC charge management system 38. The AC charge management system 38 ensures that an input electric current from the external power source 30 is matched to a current required to operate the electrical energy storage 17. A third switch 39 is provided in the third circuit 37. The controller 31 can monitor a charging state of the electrical energy storage 17 and, for example, when the charging state of the electrical energy storage 17 is below a predetermined threshold, turn off the first switch 32 and turn on the third switch 39 to supply the electrical utility directly from the external power source 30.

Figure 8:
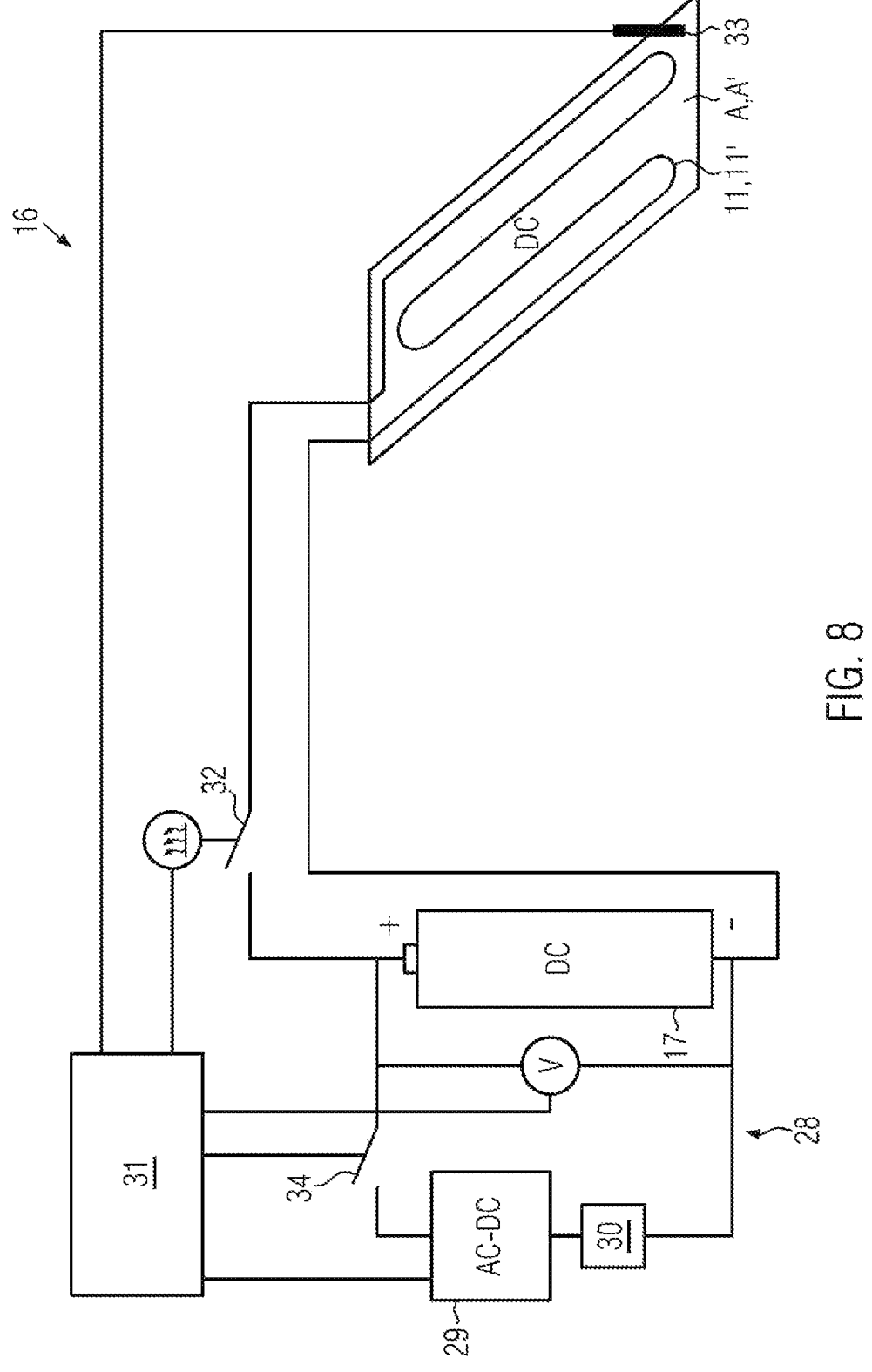
FIG. 8 shows a schematic representation of a further embodiment of the energy supply system.

FIG. 8 shows a schematic representation of a fifth embodiment of the energy supply system 16 of the road construction machine 1, 2, 14. The fifth embodiment differs from the first embodiment in that the electric consumer 11, 11' is directly connected to the electrical energy storage 17 of the energy supply system 16. Here, the electrical energy storage 17 supplies the electric consumer 11, 11' with current necessary for the operation of the electric consumer 11, 11'.

The principle according to the disclosure of operating an electric consumer used for heating with current from an energy storage directly connected thereto can also be used on other machines, for example on agricultural machines, in order to maintain a working unit thereon at a desired operating temperature.

What is claimed is:

1. A road construction machine in the form of a road paver or a feeder vehicle for conveying paving material to a road paver, the road construction machine being self-propelled and comprising a primary drive source, a hopper, at least one working unit and at least one electric consumer arranged and configured to heat the working unit, wherein the road construction machine comprises an energy supply system with at least one electrical energy storage which can be charged by means of electric current generated outside the road construction machine and which is present on the road construction machine as an internal power source for direct current supply to the at least one electric consumer and wherein the road construction machine comprises a pump transfer gearbox and hydraulic pumps connected thereto, the electrical energy storage being configured for supplying power to the at least one electric consumer independently of the operation of the pump transfer gearbox.

2. The road construction machine according to claim 1, wherein the at least one electric consumer can be supplied with current by the at least one electrical energy storage independently of an operation of the primary drive source.

3. The road construction machine according to claim 1, wherein the at least one electric consumer is directly connected to the at least one electrical energy storage.

4. The road construction machine according to claim 1, wherein the at least one electrical energy storage is a battery.

5. The road construction machine according to claim 1, wherein the energy supply system is connectable to an external power source for charging the at least one electrical energy storage.

6. The road construction machine according to claim 5, wherein the energy supply system is arranged and configured to supply electric current to the at least one electric consumer by the external power source.

7. The road construction machine according to claim 1, wherein the energy supply system comprises at least one frequency converter, one DC-DC converter and/or one DC-AC converter.

8. The road construction machine according to claim 1, wherein the energy supply system comprises an AC-DC charge management system and/or an AC charge management system.

9. The road construction machine according to claim 1, wherein a line used to connect the at least one energy storage to the at least one electric consumer is configured both for transporting current and for transporting data.

10. The road construction machine according to claim 1, wherein the energy supply system comprises a controller configured to monitor a charging state of the at least one electrical energy storage and/or to control a charging process of the at least one electrical energy storage via a switch and/or to control the supply of electric current to the at least one electric consumer as a function of a charging state of the at least one electrical energy storage.

11. The road construction machine according to claim 10, wherein the controller is connected to a temperature sensor configured to detect a temperature of the paving material, the at least one electric consumer and/or the working unit, wherein the controller is configured to control the current supply of the at least one electric consumer by a switch depending on the detected temperature.

12. The road construction machine according to claim 1, wherein (i) the road construction machine is a road paver, the at least one electric consumer being a heating device and the working unit being a paving screed of the road paver, the heating device being configured for heating at least one component of the paving screed of the road paver, or (ii) the road construction machine is a feeder vehicle for conveying paving material to a road paver, the at least one electric consumer being a heating device and the working unit being a transport device of the feeder vehicle, the heating device being configured for heating at least one component of the transport device of the feeder vehicle.

13. The road construction machine according to claim 1, wherein the primary drive source of the road construction machine is an electric motor, a hydrogen engine, a fuel cell, an internal combustion engine and/or a hybrid engine.

14. A road construction machine in the form of a road paver or a feeder vehicle for conveying paving material to a road paver, the road construction machine being self-propelled and comprising a primary drive source, a hopper, at least one working unit and at least one electric consumer arranged and configured to heat the working unit, wherein the road construction machine comprises an energy supply system with at least one electrical energy storage which can be charged by electric current generated outside the road construction machine, wherein the at least one electrical energy storage is present on the road construction machine as an internal power source for direct current supply to the at least one electric consumer and wherein the at least one electrical energy storage comprises a battery, the battery being located in an area of the at least one electric consumer within a heat-insulating housing.

15. The road construction machine according to claim 14, wherein a line used to connect the at least one energy storage to the at least one electric consumer is configured both for transporting current and for transporting data.

16. A road construction machine comprising:

at least one working unit;

at least one electric consumer arranged and configured to heat the working unit; and an energy supply system with at least one electrical energy storage configured as an internal power source for direct current supply to the at least one electric consumer, wherein the at least one electrical energy storage is chargeable by an electric current generated outside the road construction machine; and wherein the energy storage comprises an energy storage network having a plurality of energy storage modules connected to form a power supply network and being distributed on the road construction machine.

17. The road construction machine according to claim 16, wherein the at least one electric consumer can be supplied with current by the at least one electrical energy storage independently of an operation of a primary drive source of the road construction machine.

18. The road construction machine according to claim 16, wherein the energy supply system comprises a controller configured to monitor a charging state of the at least one electrical energy storage and/or to control a charging process of the at least one electrical energy storage via a switch and/or to control the supply of electric current to the at least one electric consumer as a function of a charging state of the at least one electrical energy storage.

19. The road construction machine according to claim 16, wherein (i) the road construction machine is a road paver, the at least one electric consumer comprises a heating device and the working unit comprises a paving screed of the road paver, the heating device being configured to heat at least one component of the paving screed of the road paver or (ii) the road construction machine is a feeder vehicle for conveying paving material to a road paver, the at least one electric consumer comprises a heating device and the working unit comprises a transport device of the feeder vehicle, the heating device being configured to heat at least one component of the transport device of the feeder vehicle.

20. The road construction machine according to claim 16, wherein a line used to connect the at least one energy storage to the at least one electric consumer is configured both for transporting current and for transporting data.

* * * * *